J. M. TRINER.
SCALE.
APPLICATION FILED MAY 8, 1916.
1,290,415.
Patented Jan. 7, 1919.
7 SHEETS—SHEET 1.
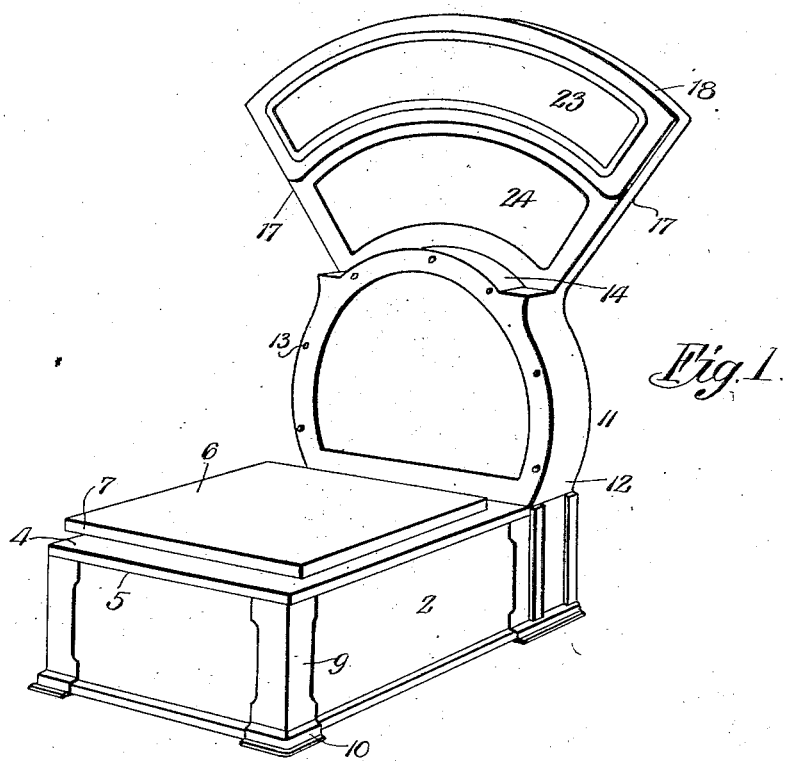
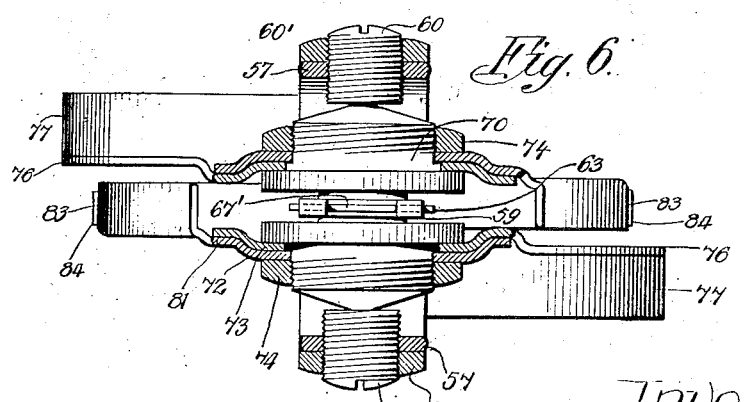
Witnesses:
Wm Harold Eichelman
Berthold Ostertag
Inventor:
James M. Triner
by
B. Singer
ATTORNEY.

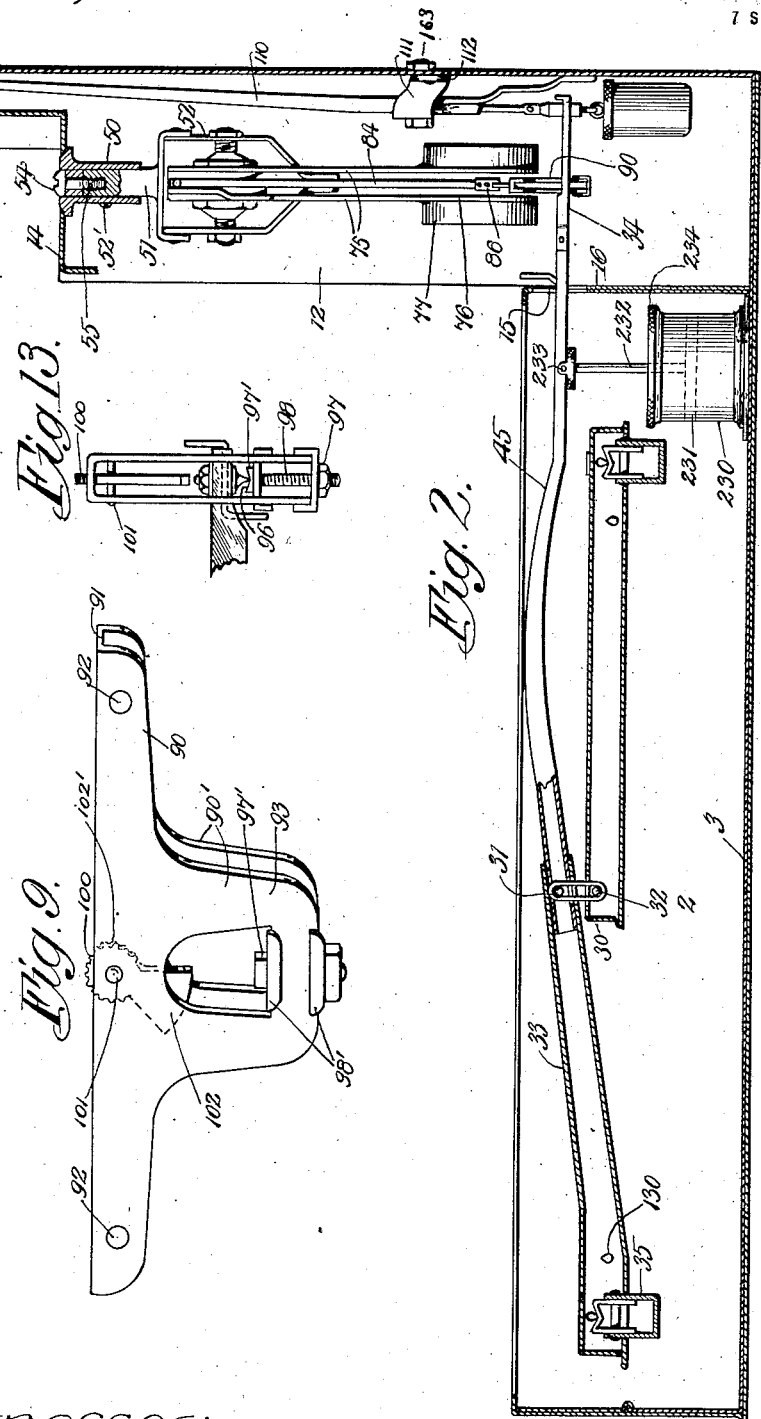

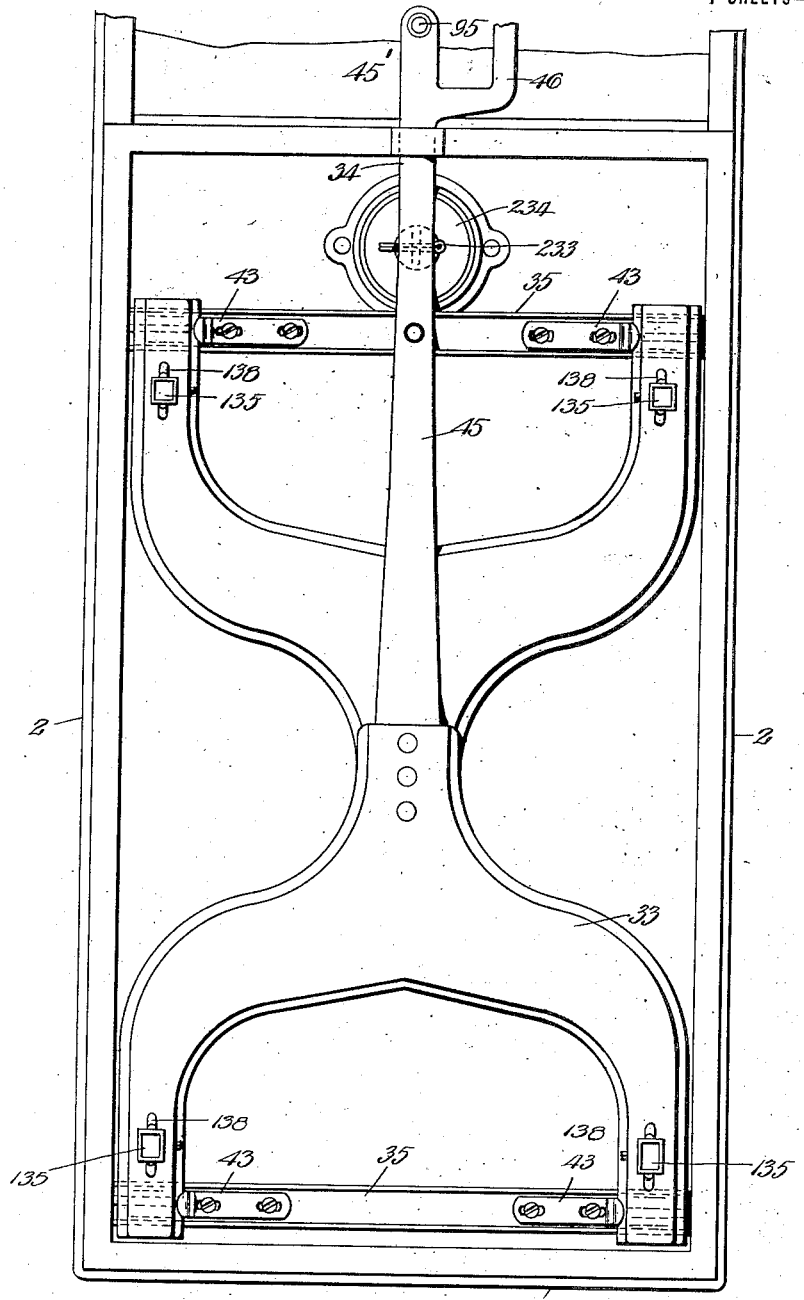

J. M. TRINER.
SCALE.
APPLICATION FILED MAY 8, 1916.
1,290,415.
Patented Jan. 7, 1919.
7 SHEETS—SHEET 4.
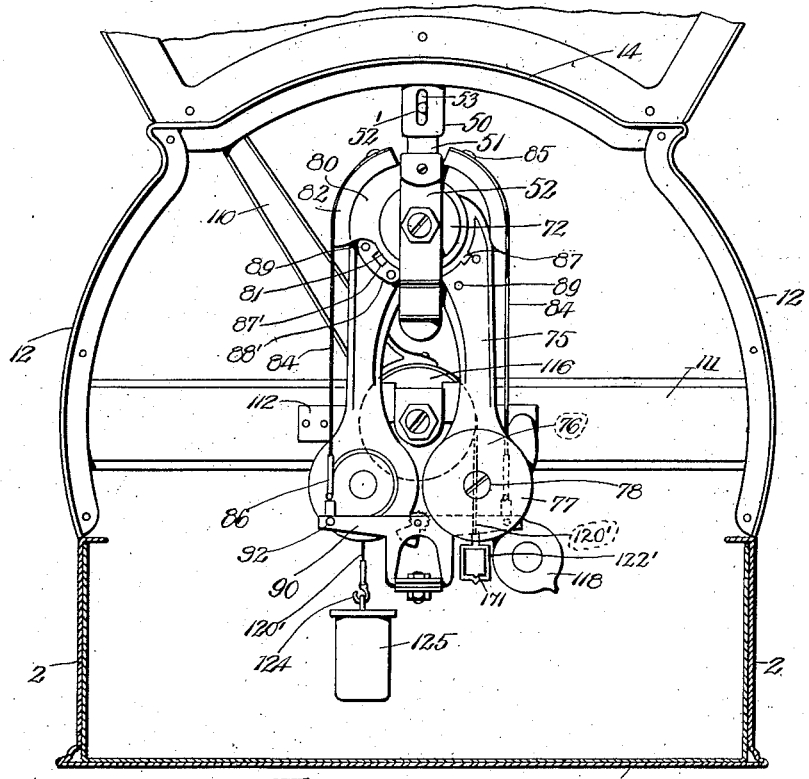
Fig. 4.
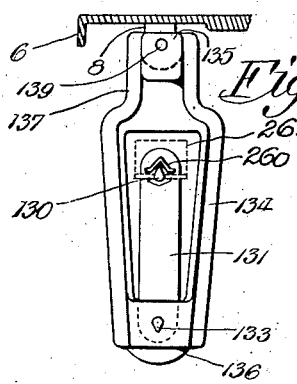
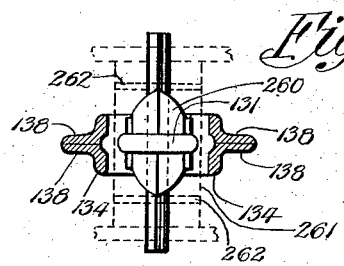
Witnesses:
Inventor
James M. Triner
by
ATTORNEY.

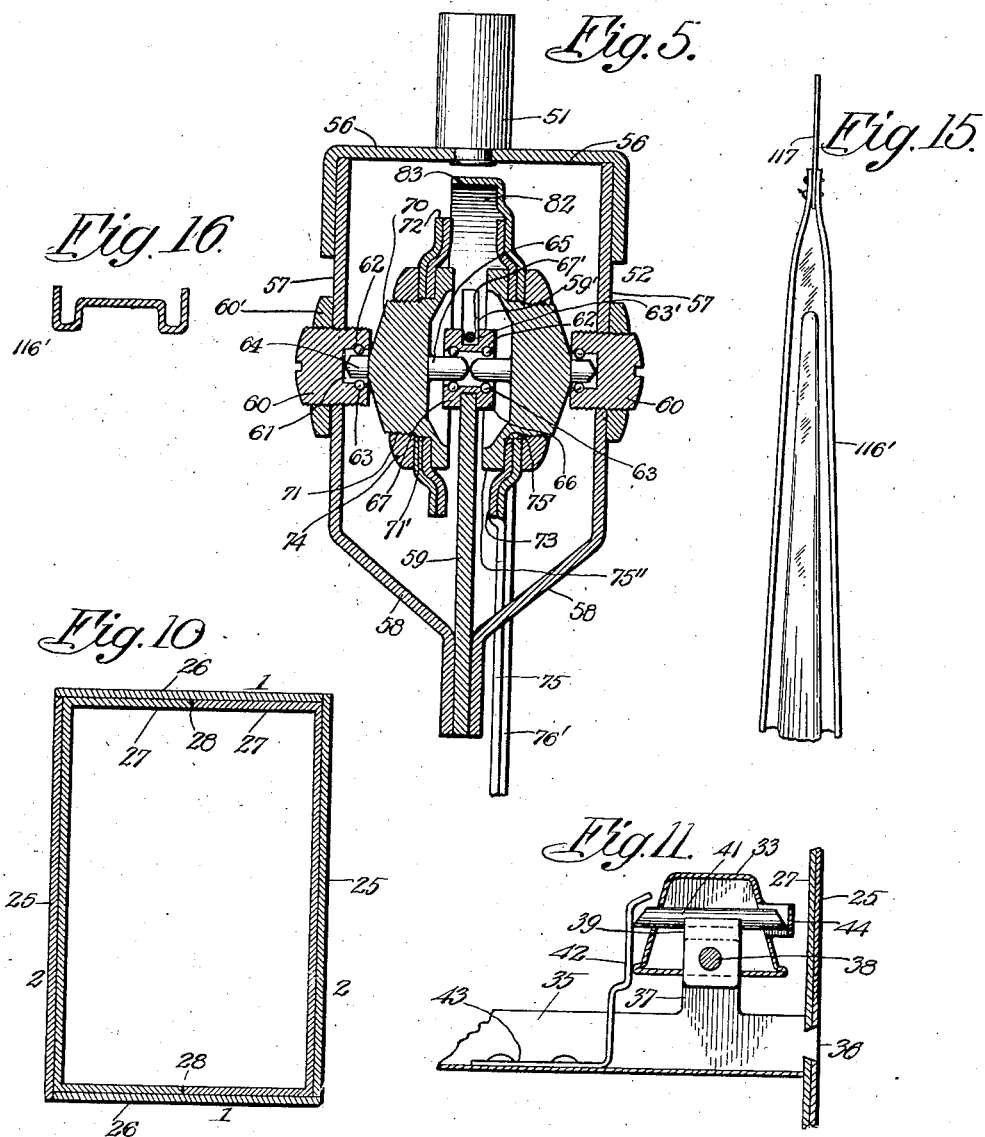

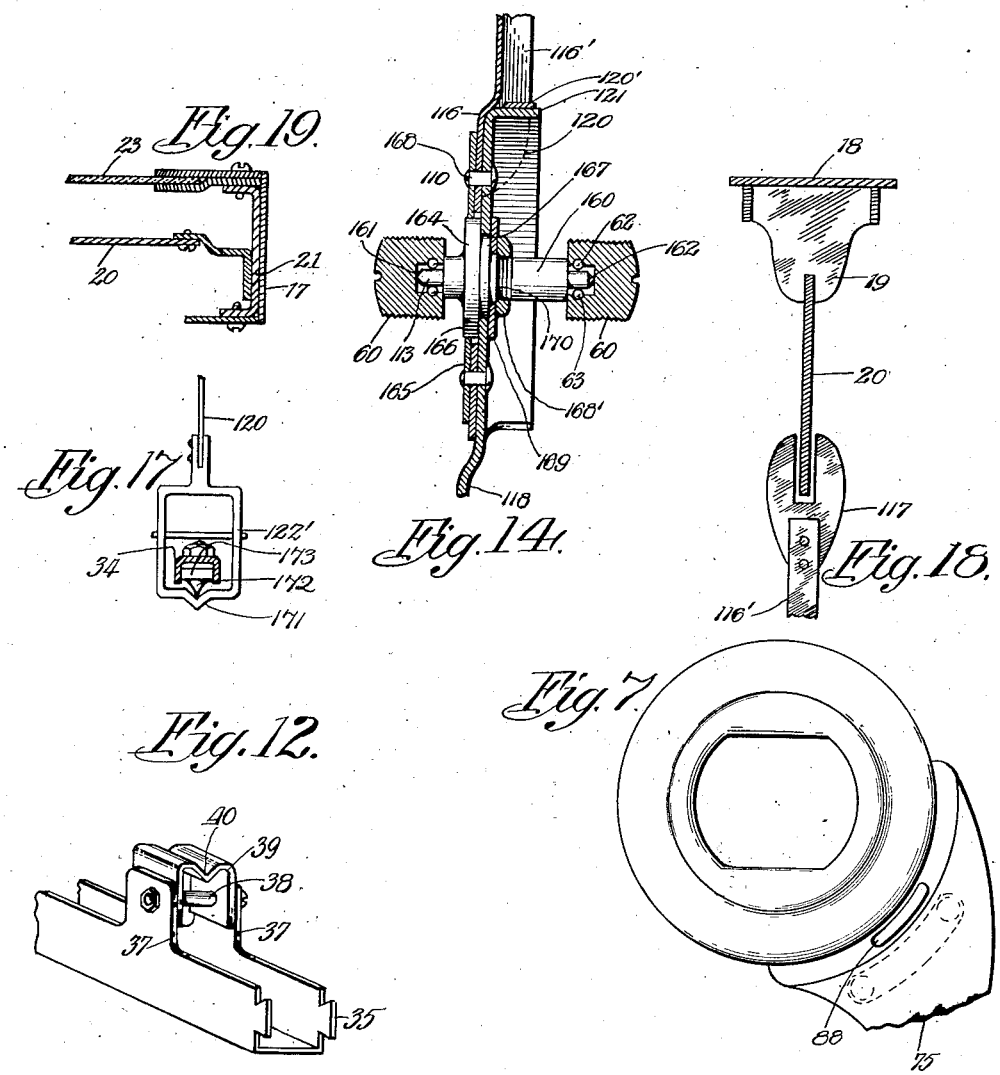

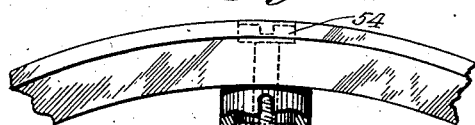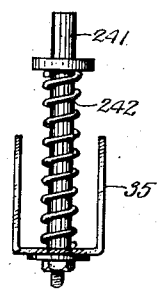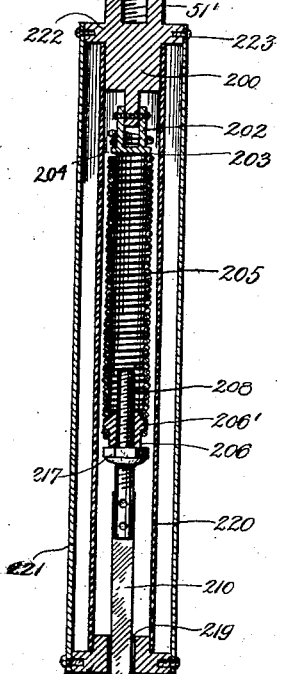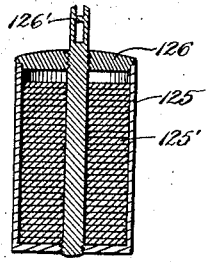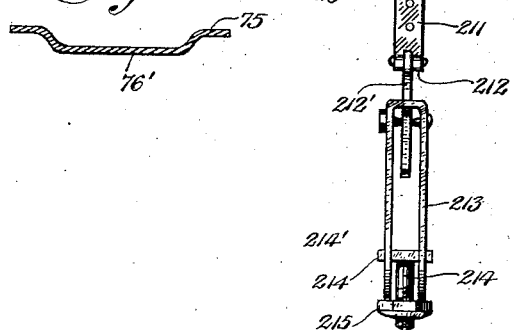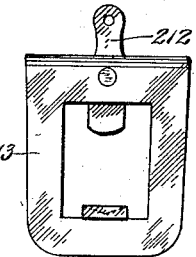

UNITED STATES PATENT OFFICE.

JAMES M. TRINER, OF CHICAGO, ILLINOIS.

SCALE.

1,290,415.

Specification of Letters Patent.

Patented Jan. 7, 1919.

Application filed May 8, 1916. Serial No. 96,209.

*To all whom it may concern:*

Be it known that I, JAMES M. TRINER, 2714 West Twenty-first street, city of Chicago, county of Cook, State of Illinois, have invented certain new and useful Improvements in Scales, of which the following is a specification.

This invention relates to weighing machines or scales and particularly to that class of scales which are adapted to be placed on a counter and which serve for indicating not only the weight of the article to be placed on the platform but also serve for computing other data having relation to the weight with the weight and for indicating the results of said computations.

One of the objects of the invention is to provide a scale of this character with an indicating device comprising a fan tail chart and an indicator or pointer playing over said chart, and to dispose this indicating device in a plane which is perpendicular to the axis of the scale lever or scale levers, in contradistinction from known fan tail scales, in which the indicating device, also comprising a pointer and fan tail chart, was arranged in a vertical plane either coinciding with the axis of the scale lever or parallel to the axis of the scale lever. The novel arrangement of disposing the fan tail chart in a vertical plane perpendicular to the scale lever has the advantage that the operator of the scale as well as the customer on the opposite side of the counter are enabled to read simultaneously the indications with which the free end of the pointer registers, without making it necessary for the operator to change his position. This arrangement enables the operator to observe the indications when he places the object to be weighed on the platform, while in known scales the operator had to bend sidewise to observe the indications on the chart.

Another object of the invention is to be seen in the arrangement of the weight absorbing element or elements, which in one of the constructions illustrated comprise a mechanism including a plurality of pendulums supported in a point the location of which may be varied with respect to the frame of the scale. The indicator or pointer coöperating with the fan tail chart, the latter being rigidly mounted in the scale, is supported in a point which is fixedly or invariably located with respect to the frame of the scale, so that an adjustment of the weight absorbing mechanism will not affect the zero location of the free end of the pointer.

Another object of the scale is to be seen in the novel arrangement of the counter weight for the scale levers and platform. In prior constructions, especially for fan tail scales and also for scales which use a computing drum, the counterweight frequently was mounted directly on the scale lever near the end of the lever pointing toward the operator, while the weight absorbing mechanism was connected with the scale lever at the free end, the scale lever being fulcrumed between its ends. This arrangement not only necessitated the use of a relatively heavy counterweight for the scale lever and platform, but also placed it readily within reach of the operator, who, either by displacing or mutilating or in any other way tampering with the counterweight, was enabled to alter the results of the weighing operation. In the construction described the counterweight for the scale levers and platform is connected with the pointer, which pointer again is also connected with the scale levers directly, and is at an end remote from the operator. The axis of the counterweight preferably is located in a vertical plane in which also the pointer is located, and the weight absorbing mechanism as well as the indicator or pointer may be said to be located in vertical planes perpendicular to the axis of the scale levers. It is an object to render this counterweight adjustable, without altering its position, so that the proper zero location of the pointer may be determined without altering anything on the weight absorbing mechanism, but simply adding or removing parts of the counterweight.

Another object of the invention is to provide a weight absorbing mechanism, including a pair of pendulums, which are symmetrically disposed with respect to a common axis of support, whereby errors which might otherwise be caused by having the scale not on a straight level are automatically eliminated.

It is furthermore an object of the invention to provide flexible connections between the weight absorbing mechanism and the scale lever or levers. This connection includes an equalizing bar loosely mounted on the scale lever and having lateral arms to the ends of which the flexible connections extending from the weight absorbing mechanism are loosely attached.

The invention also contemplates the construction of a weighing mechanism or scale of elements which are constructed principally of stamped sheet metal, in contradistinction from known scales, wherein scale levers, pendulums, and other movable parts were constructed as castings, which required, owing to the sensitiveness with which weighing machines have to be endowed, considerable machining operations. In the present scale, not only the scale levers are constructed of stamped sheet metal elements, but also the pendulum arms, the supports for the scale levers, the pointers, the cam elements from which flexible connections extend to the scale lever, and the frame. This novel manufacture of the weighing machine greatly reduces the cost of making the same without having a detrimental effect on the sensitiveness of the device and without decreasing the rigidity of the several parts or of the entire combination.

Another object of the invention is to provide a fan tail scale with a longer chart, rendering it thereby possible to perform weighing operation within wide limits, without requiring adjustments of a poise or the like. This object is accomplished by rendering the pointer movement dependent solely upon the movement of the scale lever, and independent of the deformation or displacement of the weighing mechanism. For this purpose the connection between scale lever and indicator includes a motion transmitting device, which translates every movement of the scale lever at a predetermined ratio into movement of the indicator. A pulley or circular disk fastened to the indicator and over which a flexible element connected with the scale lever is trained serves as a translating device in the scale described.

Another object of the invention is to provide improved ball bearing supports for weight absorbing mechanisms and indicator. The improved bearing structure renders the axis of the shaft or pivot to be supported "self-locating" and actually carries the weight of the shaft on a few balls in the lower portion of the bearing only.

With these and other objects in view, which will become more apparent from the following specification and the claims appended thereto, I have illustrated an embodiment of the invention in the accompanying drawings, wherein:

Figure 1 is a perspective view of the complete scale.

Fig. 2 is a longitudinal section partly through the center of the lower portion of the scale and partly through one scale lever, some of the parts being shown in elevation.

Fig. 3 is a top plan view of the scale levers and their supports with the frame.

Fig. 4 is a front elevation, partly in section, of the weight absorbing mechanism.

Fig. 5 is a section, partly in elevation, of the yoke for the weight absorbing mechanism.

Fig. 6 is a horizontal section, partly in elevation, through the same yoke and pendulums.

Fig. 7 shows the upper extension of a pendulum arm.

Fig. 8 is a section through a pendulum arm.

Fig. 9 is a perspective view of the equalizer bar.

Fig. 10 is a diagrammatic section of the scale's frame.

Fig. 11 is a section through an end portion of a lever supporting bar.

Fig. 12 is a perspective view of a lever supporting clip.

Fig. 13 is an end view of the equalizer bar.

Fig. 14 is a sectional view through the center of the indicator arm and translating device.

Fig. 15 shows the end portion of the indicator arm or pointer.

Fig. 16 is a section through said pointer.

Fig. 17 is partly section, partly elevation, of the clip for connecting the levers with the indicator device.

Fig. 18 is a section through the dial in its relation to the pointer.

Fig. 19 is a sectional view of the dial support.

Fig. 20 is partly elevation and partly section of the platform support.

Fig. 21 is partly section and partly top plan view of the platform support and protector for the knife edge.

Fig. 22 is partly section and partly elevation of a modified construction of a weight absorbing mechanism.

Fig. 23 is a link connecting said modified weight absorbing mechanism with the lever system in front elevation.

Fig. 24 is a side view of the stop for the scale levers, and

Fig. 25 is a section through an adjustable counter-weight for the scale levers.

The weighing machine comprises a frame structure, preferably of rectangular configuration, having end walls 1 and side walls 2 provided near the upper and lower edge with inwardly projecting flanges, the bottom of the frame structure being closed by a plate 3, while the top is closed by a detachable plate 4 having downwardly extending flanges 5. The top plate has a plurality of apertures through which the supports for the platform project. The platform 6, comprising a reinforced plate with downwardly extending circumferential flange 7, also is provided with lugs or feet 8 adapted for insertion into the platform supports described below. The corners of the frame structure may be reinforced by suitable sheet metal parts 9 welded or in some other way connected with adjoining walls and provided at their lower ends with beaded extensions 10, which may serve as foot rests for the weighing machine.

The weight absorbing mechanism and the indicating device are both located near the rear end of the platform, and are disposed within an extension 11 riveted or in some other way connected to the frame structure proper. This extension comprises upright members 12 also made of sheet metal and slightly curved to improve the appearance of the scale, the front of the extension being closed by a cover 13, which may be fastened to the uprights 12 by screws or some other suitable fastening means. This cover is also attached to a transverse member 14 made of sheet metal and preferably curved in the central portion of the same, while the lower edge of the cover plate 13 is inserted into a groove formed between a partition wall 15 transversely inserted between the side walls 2 of the frame and a rail 16 slightly offset in its upper part from the partition wall while the lower part of said rail is welded or fastened in some other way to the partition wall 15. The uprights 12 projecting from the frame are continued upwardly in the form of diverging extensions 17, which are connected at their upper ends by a narrow transverse arc member 18 preferably made of sheet metal and serving as a closure for the frame extension as well also as means for attaching holders 19 on which the fan tail shaped chart 20 is secured. This fan tail shaped chart is mounted in the upper part of the extension, and its ends are supported on angular brackets 21 secured to the upright extensions 17. The chart is rendered visible to the operator as well as to the customer on the opposite side of the counter through the glass plates 23, one of which is only shown in Fig. 1 at the front of the extension to the frame. The upper portion of the extension between the transverse member 14 and the glass plate 23 may be closed by a separate cover plate 24, which may be detached if it is desired to have access to the upper part of the pointer.

That part of the frame structure which surrounds the scale levers and which comprises the end walls 1 and lateral walls 2 is composed of layers of sheet metal plates. By this means the rigidity of the frame structure is greatly enhanced without making it as cumbersome and heavy as frame structures built up of castings. By suitably interconnecting the various layers of which these walls are built up; as, for instance, by spot welding, a frame structure may be made which does not require any additional machining after the layers of the walls have been united. In the construction disclosed (Fig. 10), the walls are composed each of two metal plates, the outer layer consisting of metal plates 25 and 26, which are in abutment at the corners of the frame structure, so that it will require four of these plates to build up the outer layer, while the inner layer is only constructed of two metal plates 27, each of them including a lateral wall and part of each end wall, so that the abutting joints 28 of the metal plates forming the inner layer are located between the corners of the frame structure. The plates of each layer are in engagement with plates of the other layer on one surface of the same.

In contrast to other fan tail computing scales, the arrangement is made in the present instance that the platform is located directly in front of and below the indicating scale. A lateral arrangement of the platform with respect to the indicating scale has the disadvantage that the attendant placing the load on the platform has to observe a scale which is at his side or at the side of the load to be weighed. If the dial is in front of him, however, the placing of the load on the platform and the removal of the same from the platform can be effected without any intermission in the observation of the scale. Where a large number of parcels of different weight and of different size have to be weighed in rapid succession, as in large mercantile houses, express companies, post-offices, etc., it has been found that by this arrangement a saving in time of about thirty per cent. can be had, owing to the arrangement of the dial with respect to the platform.

The scale levers used in connection with this fan tail computing scale are preferably made also of sheet metal, to combine great rigidity with a reduction in the weight of same, and they are in general similar to the scale levers described and claimed in my copending application, Serial No. 829,903. The combination of the scale levers includes two arch shaped members supported near their free ends on knife edges and loosely interconnected at their bights by means of a link 30 hung over knife edges 31 and 32 rigidly mounted in both of the levers. The upper or main lever 33 is extended at its forward end, and this extension passes through the partition wall 15, which has a suitable opening for this purpose and carries adjustably at its front a further extension or nose iron 34. The support of the scale levers with respect to the frame is effected by means of bars transversely mounted in the frame and rigidly fastened in the lateral walls of the same.

These bars, in the embodiment selected for illustration, are made of stamped sheet metal and are constructed as channel bars having a U-shaped cross-section, the ends of the bars being dove-tailed into the lateral walls 2 of the frame structure, as indicated at 36 (Fig. 11), and being held in place with respect to the frame by riveting of the dove-tailed ends or by other suitable means.

The knife edges of the scale levers are movably supported on these transverse channel bars in the following manner: The flanges of the channel bars are extended upwardly at suitable distance from the side walls of the casing so that short uprights 37 project from the top edge of the bars (Fig. 12). A threaded pin 38 extends through both of these opposing projections, and is held therein by means of a head fastened to one end of the pin, while the other end carries a nut whereby the pin may be securely locked in place. A small bracket or clip 39, preferably also made of sheet metal, comprises a back portion having an indentation 40 and two leg portions, the distance between the two leg portions being equal to the distance between the upright flanges 37 of the bar. This clip, being provided with registering holes in the legs through which the pin 38 extends, is thereby rotatably mounted with respect to the transverse bar 35. The reduced edge of the knife 41 supporting a leg of the scale lever is resting on the indentation of the clip so that the support of this scale lever will automatically adjust itself to remain at a level even though the scale may be placed on a platen or platform without having all of the foot portions in exactly the same level.

The knife edge 41 projects through the walls of the scale lever (Fig. 11), and this projecting end is guarded by a clip 42 having an angular extension 43, which is riveted or fastened in some other way to the channel bar and projects from said channel bar upwardly into proximity of the knife edge. A small guard clip 44 is also fastened to the other side of the scale lever by rivets or the like.

The nose iron 34, adjustably secured to the extension 45, which projects from the central portion of the main lever 33, and which passes through the partition wall 15, has a plurality of prongs. One of these prongs 45' is located in a vertical plane passing through the central axis of the scale lever, while another prong 46, preferably longer than the first named prong, is located in a vertical plane which does not go through the axis of the scale lever and which projects beyond the end of the first named prong 45'. The first named prong 45' serves for connecting the scale levers with the weight absorbing mechanism, while the second, or longer, prong 46 serves for connecting the scale levers with the indicating device, so that the weight absorbing mechanism and the indicating device are independently connected with the extension of the scale levers.

One form of the weight absorbing mechanism, as described in connection with Fig. 4, comprises a plurality of pendulums. The weight absorbing mechanism is supported from the transverse member 14, which connects the upright extensions 12 on the frame. A sleeve 50 having a central bore is riveted at its upper end or rigidly fastened in some other suitable way to the transverse member 14 projecting downwardly therefrom, and is adapted to receive slidably the stem 51 of a yoke indicated as a whole at 52, in which the weight absorbing mechanism is supported. The stem has circular cross-section to fit into the sleeve, and is prevented from rotating within the sleeve by means of a set-screw 52', which extends through a longitudinal slot 53 in the sleeve 50 entering a threaded aperture in the stem.

An adjustment in vertical direction of the yoke may be effected by means of a screw 54 accessible from the upper end of sleeve 50 and engaging a bore 55 having internal thread in the stem 51. By rotation of the screw 54 the stem 51 will be drawn upwardly into the sleeve or may be lowered with respect to the transverse member 14, so that the weight absorbing mechanism can be adjusted with respect to the frame or to the scale levers without affecting in any way the indicating device, which is not supported in the yoke 52. The foot end of the stem 51 is provided with lateral arms 56 having angular extensions which are rigidly connected with the upper ends of arms 57. The lower ends of the vertical arms 57 are angularly deflected so as to converge downwardly, as indicated at 58, and at their free ends they are united with a central vertical tongue 59, which serves as a support for a bearing structure holding journal pins of the pendulums. This central tongue 59 extends from the point of connection between the deflected portions 58 upwardly toward the lower surface of the lateral arms 56, with which the stem 51 is rigidly connected.

The depending arms 57 are each provided with an aperture serving for the reception of a bearing member 60, which is threaded externally so as to be adjustable with respect to the arms. This bearing member has a central recess 61 in which an annular groove 62 is located, and this groove serves as a ball race for the bearing balls 63, which are in engagement with the journal pin 64 projecting from one surface of the pendulums. It will be seen that by this construction the pendulum is supported in a ball bearing which can readily be removed from the supporting bracket or yoke and which also may be adjusted in axial direction by rotation of the threaded element 60, this element being secured in adjusted position by the nut 60''. An extension 65 at the opposite end of and in axial alinement with the journal pin 64 projects from the other surface of the pendulum and finds a similar support in a ring 66 inserted into the central tongue 59 of the yoke, which tongue has a slot 59' open at the upper end of the tongue, so that the ring 66 may be lowered into the slot. The ring 66 has holding flanges 67 at both sides of said central tongue. This bearing ring also is provided with internal annular grooves 62 on each side adapted for the reception of ball bearings 63, and it is secured in position by means of a pin 63' driven transversely through the tongue 59 and through the central outer annular groove 67' between the flanges 67.

The entire yoke, with exception of the parts which are to be manufactured on a lathe, is made of stamped sheet metal and the several parts are held together by riveting, welding, or in some other suitable way. The journal pins 64 and 65 form axial extensions of a short rod 70, substantially of circular cross-section, extending through the upper portion of each pendulum; this rod has a threaded portion at 71 and a circular portion or shoulder at 71' on which the plate 72 of the cam member is resting, and this plate may be forced against the circular extension 73 at the upper end of each pendulum arm by the nut 74. The extension 73 of the arm rests on a non-circular shoulder 75' forming part of the short rod 70, and is forced by the nut 74 against a larger circular flange 75'', having a central depression or recess 76' into which a holding flange 67 of the ring 66 projects. By reference to Fig. 5 it will be noted that the ends of the pivot extensions 65 are rounded and are in abutment at their central portions, so that axial friction is reduced to a minimum.

Each pendulum comprises an arm 75, preferably made of sheet metal and having a circular extension 73 at the upper end, and a similar or larger circular extension 76 at the lower end. The arm 75, which is of sheet metal, may be reinforced by being bent in cross-section to provide a corrugated rib 76', which is offset from the marginal portions of the arm 75. The circular extension 73, through which the short rod 70 extends and which for this purpose has a non-circular aperture corresponding to the non-circular shoulder 75, may be located in a plane with the marginal portions of the arm 75. The lower circular extension 76 on the arm carries a circular casing 77, in which disks of lead (not shown) or other heavy material are concentrically secured by means of a fastening screw 78.

From the above description it will be seen that the entire weight absorbing mechanism can be adjusted in vertical direction by adjustment of the screw 54, and that rotation of the same about the vertical axis is prevented, owing to the provision of the set-screw 52', which enters through the slot 53 in the sleeve 50. The plane of the central tongue 59 in the supporting yoke for the weight absorbing mechanism may be considered as defining the "plane" of the same, and it will therefore be understood that this weight absorbing mechanism is located in a plane which is perpendicular to the central axis of the main lever 33.

The weight absorbing mechanism is connected with the scale levers by means of cam members rigidly attached to the pendulums, and flexible connections extending from said cam members. The cam members 80 have circular portions 72 consisting of stamped sheet metal plates, which are concentrically mounted with respect to the circular extensions 73 on the pendulum arms 75, and integral with said circular plate 72 on each cam member is an eccentric cam portion 82 having a flange 83, which is bent at right angles to the plane of the circular portion 81. Near the upper end of the curved eccentric flange 83 flexible connections are secured, preferably in the form of steel bands 84, which are fastened by rivets 85 or the like. The lower ends of the flexible steel bands 84 are provided with clips 86, whereby the cam members may be secured to the lever system, as will be described below.

The circular plates 72 of the cam members 80 are clamped against the circular extensions 73 of the pendulums by the nuts 74; they are pressed against those surfaces of the pendulum plates 73 which are directed away from the common bearing ring 66. The angular flanges 83, however, of these cam members are both bent into direction toward the central plane going through the tongue 59, and they are sufficiently broad so that the flexible connections 84 secured to these flanges lie in one common plane, even though the circular plates 81 are on the opposite outer surfaces of the pendulum disks 73. Each of the circular plates 81 furthermore is provided with a tongue 87 projecting in the plane of said circular plate in a direction substantially opposite to the direction of that portion of the plate which carries the flange 83. These tongues 87 project each through an aperture 88 in the corrugated portion or rib of the pendulum arm 75 and enter into the recess 87' of a locking plate 88', which is secured on the rear surface of each pendulum arm by means of holding screws 89. By this means the location of each cam member may be positively fixed to bring the "hump" or middle part of the flange of the cam member into proper position and to render it effective under that load, under which it should become effective. If upon testing the scale it is found that this "hump" is not quite in proper position, a locking plate having the recess more or less off center on one or the other side of its center line will be selected and the test repeated, until it is found that with a locking plate 88' having the recess 87' in proper position the scale weighs correctly. This locking plate is then permanently secured to the pendulum arm, and the cam member will thereby be retained in proper position. A rotation of the cam member with respect to the circular extension 73 of the pendulum is prevented even in the continued use of the weighing machine, and the occurrence of errors in the weighing operations which might otherwise be introduced by an angular movement of said cam members with respect to said circular extensions is avoided.

The cam members 80, securely connected with, but detachable from the pendulum 75, are also made of sheet metal, contrary to the construction of similar cams, which usually were made as an integral casting with the pendulum or as a separate casting. Owing to the construction of the cam member of stamped sheet metal, the curvature of the cam flange 83 may be adjusted so as to obtain a predetermined angular deflection of the scale levers with each uniform increase of weight on the scale platform. In weighing machines in which this cam member was formed of a casting, inequalities in the cam surface, which again caused unequal deflections of the scale levers with equal increases in weight on the platform, could only be remedied by grinding off those portions of the surface which showed projections or humps where these humps were detrimental to the exact weighing; and an inexact cam surface, where the inexactness was caused by the opposite defect (a slight indentation), could only be corrected by grinding off the entire cam surface, excepting that portion which caused the inexactness. If, in the present invention, a similar defect should be present in the cam flange 83, it is possible to remedy the same by bending the sheet metal flange outwardly, that is by raising the indented portion, or by some other suitable deformation of said flange caused by the application of strong pliers. A deformation of the adjusted cam flange by accidents, shocks, or the like as they may occur in every day weighing operations, is hardly possible, as the cam plate 80 is made of sufficiently heavy stock to withstand these accidental strains.

In order to connect the weight absorbing mechanism, comprising in the embodiment described above two pendulum arms and two cam members, with the scale lever 33, an intermediary member, in the form of an equalizer bar 90, is provided. The equalizer bar comprises a horizontal portion 91 having near its ends transverse pins 92, to which the clips 86 at the ends of the flexible connections 84 may be detachably secured. The horizontal portion 91 of the beam is integral with a central projection in the form of a stirrup 93 through the opening of which the axial shorter prong of the nose iron projects. The connection between the nose iron and the equalizer bar is rendered readily detachable, as a pointed screw 95 securely held by means of a lock nut or the like in the front portion of the said prong engages with its point a central indentation 96 in the head 97', of a screw 98 which is secured to the bottom member of the stirrup 93. This bolt 98 extends through the bottom portion of the stirrup projection 93 and is held in place by a nut 97, tightened up against the lower edge of the stirrup. The equalizer bar 90, like the other main parts of the weighing machine, is made of a blank stamped sheet metal, which is bent centrally so as to present two depending flanges 90' separated from each other by a slight interspace. Clips 98' are secured to the upper and lower edge of the bottom member on the stirrup and serve as washers for the head 97' and for the nut 97 of the bolt, receiving the bearing point of the nose iron screw 96.

Owing to the weights 77 on the pendulums, the equalizing bar 90 will be drawn upwardly continuously, as the ends of this equalizing bar are connected by the steel bands 84 to the cam flanges 83. The weight of the pendulums, therefore, has a tendency to force the head 97' into engagement with the needle point on the screw 95. If it is desired to detach the equalizer bar from the nose iron, this bar is forced downwardly to a slight extent with respect to the nose iron, whereby the engagement between the head 97 and the point of the screw 95 is interrupted. This downward movement of the equalizer bar with respect to the nose iron is effected by a small cam 100 freely rotatable in the upper part of the stirrup portion of the equalizing bar and preferably disposed in the small interspace between the two flange portions of the equalizer bar 90. The cam 100 comprises a portion 102' concentric with its pivot 101, and projecting slightly above the top edge of the bar; this concentric projecting portion is integral with an eccentric portion 102 projecting downwardly into engagement with the top end of the screw 95 on the nose iron. The cam 100 is mounted loosely so that it is gravity-controlled and so that the heavier eccentric portion will ordinarily be directed downwardly, and by slightly rotating the knurled projecting portion 102', the eccentric portion 102 will be forced out of engagement with the top surface of the screw 95. After these two members are disengaged from each other, a slight downward pressure on the equalizer bar 90, overcoming the weight of the pendulum system 77, and a slight rearward movement will be sufficient to remove the equalizer bar from its connection with the nose iron.

It should be noted that in spite of the duplicate arrangement of pendulums only one point of engagement between this weight absorbing mechanism with the scale lever system is used, this point of engagement being where the pointed end of the screw 95 rests on the head 97'. It is obvious that the extent to which the pointed end of the screw 96 projects from the nose iron may be regulated by adjusting the screw within its position.

By the weight absorbing system as described above, it will be noticed that any force acting on the scale levers will have a tendency to act on the equalizer bar at the front of the nose iron, whereby said equalizer bar is pulled downwardly. This downward movement of the bar is transmitted by the flexible members 84 to the cam elements 80 mounted symmetrically with respect to the fulcrum of the pendulums, and owing to the rigid connection of the eccentric cam elements with the pendulums, a swinging movement is imparted to the latter. Owing to the relatively large leverage, between the weights of the pendulums and the cam elements, a relatively large force must be used in pressing on the scale levers for imparting swinging movement to the free and weighted ends of the two pendulums. The amplitude of the swinging movement will be at different conditions in different proportion to the weight acting on the scale levers without being, in any way, dependent upon the distance between the fulcrum of the pendulums and that point on which the scale levers engage the system of the pendulums; namely, the needle point bearing of the nose iron in the equalizer bar. It will also be obvious that, owing to the arrangement of a pendulum on each side of the equalizer bar, and owing to the said bar extending laterally toward both sides of the needle point bearing, the swinging movement of both pendulums will be uniform. Finally it will be noticed that contrary to the known construction of scales it is not absolutely necessary to have the scale placed on a straight level. Even if one corner or one side of the entire scale should be raised with respect to other corners or another side, the entire system, being freely suspended from one point, will automatically adjust itself, so that upon depression of the equalizer bar by a force acting on the scale lever system, the two pendulum members will be swung outwardly an equal distance from a center line connecting the needle bearing point on the equalizer bar with the fulcrum of the pendulums.

In most of the weighing machines using pendulums or springs as weight absorbing mechanisms, and especially in most of the constructions pertaining to the class of fan tail computing scales, the indicating device includes a pointer rotatably supported on an axis which coincides with the fulcrum or axis of oscillation of the pendulums. The pivot pin of the indicator or pointer is frequently rigidly connected with the pivot pins or journals for the pendulums, so that the deflection of the pendulums is directly proportional to the deflection of the pointer. This swinging movement of the pendulums is, however, not exactly proportional to the weight increase on the platform, over a large range of movement, and the result is that these indicating devices in known scales have uniform graduation over a very short part of the fan tail chart. Where legal or other restrictions forbid the use of computing charts with varying graduation marks, the weighing capacity of these scales is very small.

It is obvious that an adjustment of the weight absorbing mechanism in vertical direction must, in the ordinary scales, also lead to the displacement of the axis of rotation of the pointer, and this again would have a tendency to alter the indications resulting from the movement of the pointer in accordance with the adjustment. This disadvantage, which is present in all fan tail scales, is avoided in the present construction by rendering the support of the indicator entirely independent of the support of the weight absorbing mechanism. In the present device, therefore, the movable element of the indicating device; that is, the pointer, rotates about a point fixed with respect to the entire frame structure of the frame, so that any adjustment of the weight absorbing mechanism which may be necessary for tensioning the flexible members or for any other reason will not have the slightest effect on the indications.

The indicating chart or dial has been described above. The movable part or pointer 110 of the indicating device finds its support in a transverse member or bridge 111, which connects the angular flanges at the rear edges of the uprights 12. This bridge or transverse member 111, which is also made of stamped sheet metal and corrugated by parallel ribs, carries midway between its end points a bracket 112 detachably fastened to the bridge 111 by screws or the like. The central portion of this bracket is provided with a threaded aperture through which a screw 60 extends identical with the bearing member 60, which serves for supporting the pendulum arm in the yoke 52. The axis of this screw is located in the center of the circle defined by one of the edges of the indicating chart or dial. A similar bearing member 60 also extends through the rear face of the bridge or transverse member 111, and both of these bearings are provided with ball races 62 for bearing balls 63 to support the journal pin 113 of the pointer 110.

The bearings show the advantage that the shafts of the pointer and pendulums respectively rest directly on the balls, and with proper selection of the size of the balls each shaft end will rest on the two balls occupying the lowermost space in the ball race. The other balls in the same race simply act as spacers, and while in slight frictional rolling contact with the surface of the shaft, do not serve for supporting the weight of the same. A "binding" of the shaft in the bearing is thereby avoided, the more so as the axial thrust is taken up in one point; namely, the needle point of pointer shaft resting against the bottom surface of the bearing screw 60, or by the contact points of the two curved abutting end surfaces of the shafts for the pendulums.

The pointer consists of a circular disk 116, from which extends in one direction an integral arm 116' of channel shaped cross-section, the width of the channel being gradually reduced in direction from the circular disk toward the free end of the arm. To the free end of the arm a bifurcated indicator clip 117 is secured by rivets or the like, this clip being arranged so that its prongs are one on each side of the dial near the lower edge of the same. In opposite direction from the channel shaped arm the pointer carries a counterweight 118, which is preferably integral with the disk 116 and which may have any suitable shape. Hence, the circular support 116 for the pointer, the arm 116', and the counterweight 118 are preferably made of one piece of stamped sheet metal to reduce the weight as well as to facilitate the manufacture of this element. A flanged circular disk or pulley 120 is centrally secured to the circular central portion of the pointer, and a steel band or other flexible connection 120' is secured by rivets or screws to the flange 121, projecting at right angles from the plane of the disk or pulley 120. One-half of this flexible tension element 120' extends downwardly and carries at its free end a stirrup 122, into which the free end of the lateral prong 34 of the main lever nose iron is introduced.

It will be seen from the above that the indicating device, comprising the indicator arm 110 and the curved chart or indicator dial, is located in a plane parallel to the plane in which the weight absorbing mechanism is located and near the same end of the platform near which said last named mechanism is disposed.

It will also be seen that the pulley with the flexible connection leading to the main lever acts as a translating device for the indicator. By selecting a suitable diameter for the pulley, to which the steel band is attached, the pointer 110 may be deflected more or less at the same movement of the prong 34 in vertical direction. If the pulley is very small, a downward movement of the prong exerting a pull on the steel band trained about the pulley will cause a larger angular movement of said pulley, as if the same would be larger. This angular or rotary movement of the pulley will be in direct proportion; however, to the movement of the prong of the lever, so that the deflection of the pointer must be proportional to any increase in weight on the platform, whereby a strict uniform division of the indicator chart is rendered possible.

The other end of the flexible element, said element being fastened to the circular flange 121 of the pulley, carries a clip or hook 124, which supports a counter-weight 125, preferably consisting of a cup-shaped member containing disks 125' of lead or similar heavy material and being closed at its upper end by a screw-cap 126, which carries a transverse pin 126' to receive the hook 124 on the flexible tension element or steel band 120'.

Contrary to the ordinary construction of scales, and especially of fan tail scales, the counterweight for the scale levers is herein located at the end remote from the operator, so that the operator is not tempted to mutilate the counterweight or to change the position of the same; furthermore the counterweight, being located at a relatively large distance from the support of the scale levers, utilizes a long leverage, thus reducing the size of the counterweight considerably as compared with weights serving the same purpose in other scales.

It will be seen that a reduction or an increase of the counterweight, resulting from adding or removing one of the disks in the same, will alter the normal height or position of the scale levers. This alteration will then lead to an alteration in the relative position of the cam members connected with the pendulums. If upon testing the scale it should be come evident that the shape of the operative cam surface of these members is correct, but that the "hump" of this surface (which becomes of importance in weighing objects having a weight midway between the minimum and maximum weight for which the scale is intended; as, for instance, when in a scale having a maximum weighing capacity of fifty pounds an article weighing twenty-five pounds is placed on the platform) is not in proper position, it will only be necessary to alter the counterweight connected with the indicator. In former scales all corrections of this cam could only be made by filing off or grinding the cam to its proper shape, because the indicator was in direct connection with the pivot of the pendulums.

The support of the shaft for the pointer, and its connection with the translating device, is similar to the connection of the support of the shaft for the pendulums and its connection with the cam members.

The indicator shaft 160 is pointed at both ends, as shown at 161 and 162, and rests with these points against the bottom walls of the ball bearing screws 60, secured in adjustable positions in the rear transverse member 111 and bracket 112' respectively by nuts 163. The pointer shaft is enlarged at 164 to receive a circular washer 165, which is secured to the central circular disk 116, the latter being provided with a non-circular opening whereby it rests on a corresponding non-circular shoulder 166 of the shaft, adjacent to the enlargement 164. A smaller circular shoulder 167 serves as seat for the translating device or pulley 121, the washer 165, disk 116, and pulley 121 being united by rivets or other fastening means 168. These parts are forced in direction toward the enlargement 164 by a nut 168' engaging a washer 169, which is forced thereby against the face of the flanged disk or pulley 121, the nut riding on the threaded portion 170 of the pointer shaft 160.

The free end of the flexible steel band connected with the translating device carries a stirrup 122', the bottom plate of which has a depression 171 to receive the pointed end of a screw 172 secured in the prong 34 of the scale lever and adjustable therein by means of a nut 173. This engagement between the stirrup plate and the screw is normally maintained, owing to the connection of the variable counterweight, also secured to the translating device by the steel band.

The invention also provides a novel support for the platform 6 on the scale levers. The scale levers are provided near their supporting points 35 with knife edges 130 extending through both of the walls of the channel shaped levers and carrying thereon links 131, which extend downwardly. A clip 260 of sheet metal is inserted between the operative edge of the knife edge 130 and the link 131 straddling said knife edge, so as to facilitate the attachment of said link and to protect the link against excessive wear caused by engagement of the knife edges. The links 131 also carry knife edges 133 near their lower ends, and these knife edges are rigidly connected with inverted stirrups 134 passing through openings in the scale levers. The upper ends of said stirrups have an opening 135 shaped in accordance with the cross-section of the lugs 8 depending from the platform 6, so that the platform will be supported by the inverted stirrups 134 from the scale levers when the lugs are inserted into the openings 135. The stirrups being suspended from the knife edges 130, it is obvious that they have freedom of movement toward both sides and forwardly and backwardly, the upper portion 137 of said stirrups projecting beyond the frame structure so that the lugs 8 can readily be inserted. The stirrup members are preferably constructed each of two stamped sheet metal parts having lateral flanges 138, which are united by welding, the central portion of these stamped sheet metal parts being offset so as to provide room for the insertion of the links 131 between the lower portions 136 of the sheet metal members. After the lugs have been inserted into the apertures 135 of the upper portions 137, they may be held therein by pins 139, which are driven transversely through the upper portion 137 and through the lug 8, the latter being provided with a suitable aperture for this purpose.

Where it is desired to use a spring as weight absorbing mechanism, the pendulum construction described above may be replaced by the spring support and spring shown in Fig. 22. This spring support comprises a stem 51' similar to the stem 51, which is used in connection with the yoke 52 for supporting the pendulum mechanism, this stem may be lowered or raised with respect to the frame by the screw 54 exactly as described in connection with the pendulum weight absorbing mechanism.

A central lug 200 projects downwardly from the lower end of the stem 51', and a pin passing through that lug supports the two prongs 202 of a small clip 203, a transverse element 204 of this clip is inserted between two of the upper end windings of a weight absorbing spring 205, the friction of the windings on the transverse members securely holding the spring in connection with the clip. In a similar way two windings of the spring 205, near the lower end of the same, hold between themselves projecting lugs 206' of a cylindrical clip 206, which clip has an internal thread to receive the externally threaded end of a stem 208. The upper portion of this stem passes through the tapped bore of the clip 206, and the lower portion is provided with a saw kerf to receive the steel band 210. After this band has been inserted into the kerf, it may be secured therein by driving rivets through the inserted portion and through the lower end of the stem 208, closing at the same time the width of the saw kerf to the thickness of the steel band. A small clip 211 is also riveted or secured in some other suitable way to the free end of the steel band 210, and this clip has two projecting lugs 212 separated from each other by a small interspace into which the upper portion of a cam 212' may be inserted. The projecting lugs on the clip and the upper end of the cam are provided with bores which are in register when the parts are assembled, and a pin may then be driven through the lugs and the projection of the cam, whereby the cam is united with the weight absorbing mechanism comprising spring and flexible band.

The cam is mounted in a link of a construction similar to the construction of the equalizer bar referred to above, this link, however, being free of any lateral arms, as this spring weight absorbing mechanism is in direct connection with the central portion of the link 213. This link may also be made preferably of sheet metal similar to the central portion of the equalizing bar and supports, in the central part between the two flanges which extend downwardly, a small screw 214, having a square head with a central indentation, as shown at 214', and held in the said interspace by the nut 215.

The opening of the stirrup link 213 serves for the same purpose as the opening in the equalizing bar; namely, to receive the projecting end of the prong 45 on the nose iron 34 to which a pointed screw is fastened, said screw entering when the parts are in operative position in the central indentation of the head.

In order to adjust this weight absorbing mechanism to the proper length between stem 51' and clip 211 without stretching or in some other way tensioning the scale spring 205, it is only necessary to rotate the stem 208 somewhat in the lower central clip, as this rotatable stem is in threaded engagement with the bore in the lower clip. After the parts have been adjusted to their proper length, a lock-nut 217, fastened on the threaded part of the stem 208, is tightened up against the lower surface of the clip 206, and the parts are then in proper adjustment.

With the intention to improve the appearance of the weight absorbing device, and especially with the intention of protecting the spring against the influence of the atmosphere and of fluctuations in temperature, an air insulated jacket is provided for the same, said jacket comprising two concentric tubings 220 and 221 separated from each other by a suitable interspace, the inner tubing being large enough to receive the spring 205. At the bottom the two tubings are closed by a disk 215, having a slot 219 through which the lower end of the band 210 and connecting clip 211 projects, and the air insulating jacket thus formed is fastened to the stem 51' by a plurality of screws 223, which go through the upper end of the outer tubing into a collar 222 forming part of the stem 51', fitted to the inner diameter of the outer tubing, said collar also being preferably in engagement with the upper edge of the inner tubing.

It will be noted that in the modified form of the weight absorbing mechanism the indicating device, comprising the chart and indicator and combined with a translating device, these parts not being shown in the drawing, is also independent of the weight absorbing mechanism, and is located in a plane parallel to a vertical plane going through the axis of the spring and perpendicular to the longitudinal axis of the main lever. In this modification, therefore, the weight absorbing mechanism and the indicating device also may be arranged at the same end of the platform and preferably at that end which is directed away from the operator.

A braking device for the movement of the main lever is provided in the form of a dash pot, the bottom of which is securely fastened to the bottom plate of the frame structure, as shown at 230; said dash pot containing a piston 231, which is flexibly connected by means of the rod 232 with a transverse pin 233 pasing through the nose iron of the main lever. The dash pot is closed on top by means of a screw-cap 234, having an aperture to permit the passage of the piston rod therethrough.

Shocks or excessive strains under which the weighing mechanism may be placed when an article, exceeding in weight the maximum weight for which the scale is intended, is placed on the platform, will be absorbed or taken up by yielding stop 240, comprising a pin 241 mounted at the free end of a strong spring 242, the lower end of which is secured in the front channel which carries the scale lever. The spring 242 preferably is selected of a strength large enough to absorb a weight twice as large as the scale is intended for. If the maximum capacity of the scale should be fifty pounds, an additional fifty pounds may be placed on the platform without subjecting the elements connected with the main lever to an excessive strain, as the excessive load is taken up by the spring 242.

It will be seen from the above that the entire scale inclosed in a casing does not present any parts which would provide any temptation for the operator to move or adjust the same. The scale may be carefully tested and adjusted in the shop and may then be sent out to the customer, who will not even be compelled to use extreme efforts in placing the scale on absolutely straight, horizontal level. All of the movable parts, including the bearings, are centrally located, and a slight tilting of the scale will not affect the accuracy of the weighing operations. It will be seen that, owing to the interposition of a translating device between the indicating device and the scale lever, the dial or chart can be made considerably longer than in other fan tail scales, and the divisions on said chart can be uniform over the entire range. It will also be seen that the adjustment of the indicating device can be rendered entirely independent of the adjustment of the weight absorbing mechanism, as the support for the weight absorbing mechanism is located at a point different from the support of the indicator.

With reference to Fig. 21 it will be noted that the knife edge 130, which serves for supporting the link 131, is protected by a small clip straddling the same, so that the link 131 while loosely in connection with the operative edge of the knife edge will not cause destruction of the same at premature time. This clip 260 resting on the knife edge 130 is at its pointed ends in engagement with a check clip 261 which has vertical wall portions 262 and horizontal portions in engagement with the walls of the scale lever. By means of this check clip 261 the smaller clip 260 is held against lateral motion, and the freely suspended link 131 is also prevented from excessive lateral movement.

I claim:

1. In a scale, scale levers; a plurality of weight absorbing elements flexibly connected with said scale levers; means for adjusting the support of said weight absorbing elements, and indicating means movably connected with said scale levers, the support of said weight absorbing element being movable with respect to the support of said indicating means.

2. In a scale, a plurality of scale levers, weight absorbing pendulums connected with said scale levers and having a common support on the scale, a fan-tail chart, an indicator adapted for movement over said chart, and means for supporting said indicator independently of the weight absorbing pendulums, said indicator supporting means being located in a vertical plane with said common support for the pendulums, said plane being parallel with the levers.

3. In a scale, the combination of a plurality of scale levers; a frame structure surrounding said scale levers; an extension on said frame rigidly connected therewith; an indicator movably mounted in a fixed point in said extension, and a weight absorbing mechanism movably mounted in said extension in a point the position of which may be varied.

4. In a scale, the combination of a plurality of scale levers; a frame structure supporting said scale levers; a vertical extension at one end of said frame rigidly connected therewith; a weight absorbing mechanism in a vertical plane adjustably mounted within said extension; a movable indicator element invariably mounted within said extension, the support for said indicator element being below the support of said weight absorbing mechanism.

5. In a scale, the combination of a plurality of scale levers; a frame structure; uprights extending from the frame structure; a transverse member connecting upper portions of said uprights; a weight absorbing mechanism; means for adjustably supporting said weight absorbing mechanism from the transverse member; a second transverse member connecting said uprights, an indicator element and means for movably but invariably supporting said indicator element in said second transverse member.

6. In a scale, the combination of a plurality of scale levers; a frame structure for said scale levers; a weight absorbing mechanism movably supported in said frame structure; an indicator element invariably supported in said frame structure, said indicator element and weight absorbing mechanism being connected with said scale levers, the weight absorbing mechanism being located in a plane between the scale levers and the indicator device.

7. In a scale, the combination of a plurality of scale levers; a rectangular frame structure surrounding said scale levers, said frame structure being composed of layers of sheet metal plates, one of the layers consisting of several plates which abut against each other midway between corners of the frame structure while plates of another layer of the frame structure are in abutment at the corners.

8. In a scale, the combination of a plurality of scale levers; a rectangular frame structure surrounding said scale levers, said frame structure having walls, each composed of several layers of plates of sheet metal, inner layers of sheet metal plates having abutting joints between the corners of the frame structure, while the outer layer has abutting joints at the corners.

9. In a scale, the combination of scale levers; a frame structure; channel bars transversely mounted in said frame structure, the ends of said channel bars being dove-tailed into walls of the frame structure and being provided with upwardly projecting portions; and knife edges on said upwardly projecting portions for the support of the scale levers.

10. In a scale, the combination of a frame structure; a transverse bar extending through said frame structure, said transverse bar being provided with an upwardly projecting portion; a clip rotatably mounted on said upwardly projecting portion, the clip being provided with an indentation; a knife edge engaging said indentation, and a scale lever supported by the said knife edge.

11. In a scale, the combination of a frame structure; a channel bar extending transversely through said frame structure and rigidly connected therewith, said channel bar being provided with a projection extending upwardly from the flanges of the channel; a clip rotatably mounted near the upper end of said flange projection; a knife edge resting on said clip; a scale lever supported by said knife edge, the ends of the knife edge projecting from the scale lever; and a guard clip mounted in the channel projecting toward the end of the knife edge.

12. In a scale, the combination of a frame structure having sheet metal walls; channel bars of stamped sheet metal extending transversely through the frame structure and dove-tailed in the walls of the same, said channel bars being provided with extensions projecting upwardly from the flanges of the channel; sheet metal clips rotatably mounted in the upper ends of said projections; a knife edge supported by said sheet metal clips; sheet metal scale levers supported by said knife edges, and sheet metal guards mounted on said transverse bars and projecting toward the ends of the knife edges.

13. In a scale, the combination of a plurality of scale levers, one of which is provided with a nose iron; a plurality of prongs rigidly connected with said nose iron; a weight absorbing mechanism; and an indicating device, said weight absorbing mechanism being connected with one of said prongs and the indicating device being connected with the other prong, said mechanism and device being supported in a common vertical plane passing through the axis of the nose iron.

14. In a scale, a plurality of scale levers; a nose iron attached to one of the scale levers, said nose iron being provided with a plurality of prongs of different length; a weight absorbing mechanism; and an indicating device, said weight absorbing mechanism being connected to one of the prongs, and said indicating device being connected to a longer prong than said weight absorbing mechanism, said mechanism and device being supported in a common vertical plane passing through the axis of the nose iron.

15. In a scale, the combination of a plurality of scale levers; a nose iron attached to one of said scale levers; a weight absorbing mechanism flexibly connected to said nose iron, and an indicating device flexibly connected with said nose iron at a point different from the point of connection with said weight absorbing mechanism, said mechanism and device being movable in planes at right angles to the axis of the nose iron.

16. In a scale, the combination of a plurality of scale levers, one of said scale levers being provided with a nose iron extending in line with the common axis of said scale levers; a weight absorbing mechanism, said weight absorbing mechanism being connected with said nose iron at a point located in a vertical plane going through the axis of said lever system; and an indicating device connected with said nose iron at a point located outside a vertical plane going through the central axis of said levers.

17. In a scale, the combination of a plurality of scale levers; an extension at one of said scale levers; a weight absorbing mechanism comprising two movable pendulums located in different but parallel planes; and a flexible connection from each of said pendulums to said extension, said flexible connections being located in one plane.

18. In a scale, the combination of a plurality of scale levers; an extension at one of said scale levers; a weight absorbing mechanism comprising a plurality of pendulums oscillatable in parallel planes; flexible connections between said pendulums and extension; a common intermediary member between said flexible connections and said extension, said intermediary member being movably attached to said extension and being located between said parallel planes.

19. In a scale, the combination of a plurality of scale levers; a nose iron rigidly attached to one of said scale levers; a weight absorbing mechanism operative in a plane transverse to the axes of the scale levers; flexible connections at different sides from said nose iron to said weight absorbing mechanism, and an intermediary transverse member embracing a portion of said nose iron for connecting the ends of said connections.

20. In a scale, the combination of a plurality of scale levers; a nose iron rigidly attached to one of said scale levers; an equalizer bar supported by said nose iron and projecting laterally to both sides of the same; a weight absorbing mechanism, and flexible connections extending from said weight absorbing mechanism to the ends of said equalizer bar.

21. In a scale, the combination of a plurality of scale levers; a nose iron attached to one of said scale levers; an equalizer bar freely supported in one point at the end of said nose iron; a weight absorbing mechanism, and flexible elements extending from said weight absorbing mechanism to the ends of said equalizer bar.

22. In a scale, the combination of a plurality of scale levers; a nose iron attached to one of said scale levers; a sheet metal equalizer bar supported in one point at the free end of said nose iron; a weight absorbing mechanism; and flexible connections extending from said weight absorbing mechanism to the ends of said equalizer bar, said points of attachment of the flexible connections to the equalizer bar being at a level above the point of support of the equalizer bar on the nose iron.

23. In a scale, the combination of a plurality of scale levers; a nose iron attached to one of said scale levers; a weight absorbing mechanism; an equalizer bar attached to the nose iron; flexible connections between the weight absorbing mechanism and the equalizer bar, and a cam element movably mounted in the equalizer bar for securing the same against detachment from the nose iron.

24. In a scale, the combination of a plurality of scale levers; a nose iron attached to one of said scale levers; an equalizer bar supported by said nose iron; a weight absorbing mechanism; flexible connections extending from the mechanism to the equalizer bar, and a gravity-controlled cam mounted in said bar and provided with a portion adapted to engage normally the point of the nose iron to which the equalizer bar is fastened.

25. In a scale, a weight absorbing mechanism comprising a plurality of pendulums having a common axis of oscillation, and scale levers, each of said pendulums consisting of an arm of stamped sheet metal having a circular extension at one end and a weight at the other end; and a cam member concentrically supported with respect to each of said pendulum supports, said cam member having an eccentric flange, and a flexible connection extending from said eccentric flange and continuously in engagement with a portion of the same, to said scale levers.

26. In a scale, the combination of a weight absorbing mechanism comprising a pair of pendulums; a common support for said pendulums; a cam member of sheet metal being concentrically supported with respect to each of said pendulums, said cam member being provided with a flange extending angularly with respect to the body of the cam member; a tension member attached to said flange, and scale levers connected with said tension member.

27. In a scale, a weight absorbing mechanism comprising a pair of pendulums; a stamped sheet metal cam member concentrically supported with respect to each of said pendulums; an eccentric cam surface member integral with each of said cam members; an extension on the cam member projecting in a direction opposite to the direction of the cam, and means on the pendulum engaging said extension for preventing rotation of said cam member with respect to the pendulum.

28. In a scale, the combination of a weight absorbing mechanism comprising a plurality of pendulums; a cam member concentrically supported with respect to said pendulums and having an eccentric cam surface, an extension on said cam member; and a locking plate engaging said extension, said locking plate being mounted on said pendulum.

29. In a scale, the combination of a weight absorbing system comprising a pair of pendulums, each pendulum consisting of a sheet metal arm having a circular extension at one end, a circular extension at the other end, said arm connecting the extensions being provided with a corrugated rib; a weight concentrically fastened to the last named circular extension; a stamped sheet metal cam member concentrically fastened to each pendulum on the first named circular extension; an extension on said cam member, said cam member being fastened on one surface of said first named circular disk; a locking plate secured to the sheet metal arm on the surface opposite to that on which the cam member is fastened to said locking plate, engaging the extension of the cam member which projects through the corrugated rib of the pendulum arm.

30. In a scale, a frame structure having uprights; a rigid transverse member connecting the uprights; a ball bearing axially adjustable mounted in said transverse member, and a pointer rotatably supported in said ball bearing.

31. In a scale, the combination of a frame structure having uprights; a transverse member connecting the uprights; a bracket attached to said transverse member; a ball bearing axially adjustable mounted in said bracket; another ball bearing axially adjustable mounted in the transverse member in alinement with said first ball bearing, and a pointer rotatably mounted in said ball bearings.

32. In a scale, the combination of a scale lever, having a nose iron; a pointed screw adjustably mounted in the free end of the nose iron; a transverse equalizer bar; a head having a depression adjustably and movably secured to the equalizer bar and adapted for engagement with the point of the screw; a weight absorbing mechanism; and elements for normally maintaining the point of the screw in engagement with the depression in said head, said elements connecting the equalizer bar with the weight absorbing mechanism.

33. In a scale, the combination of a frame structure having uprights, a transverse bar connecting the upper ends of said uprights, a transverse member connecting said uprights below their upper ends, a bracket mounted on said transverse member, a pointer rotatably mounted in the bracket of said transverse member; an indicating chart and a support for the same, a weight absorbing mechanism supported by said bar, said frame structure, transverse bar, transverse member, bracket, pointer and support being made of sheet metal.

34. In a scale, the combination of a scale lever, a knife edge mounted in said scale lever; a link suspended from said knife edge, a stirrup attached to the lower end of said link, said stirrup projecting through the scale lever beyond the same upwardly and being provided at its projecting end with an opening; a platform, and a lug on said platform, said lug being adapted for insertion in said opening.

35. In a scale, the combination of a pair of pendulums, a pair of shafts in axial alinement with each other and in rigid connection with said pendulums, the ends of the shafts, which are directed toward each other, having a convex curvature and being in frictional contact with the central point of the convex surface; and a pair of ball bearings for each shaft, the balls in said bearings being in frictional contact with each of said shafts.

36. In a scale, the combination of a pair of pendulums; a pair of shafts in axial alinement with each other and in abutting relation to each other, each of said shafts carrying one of said pendulums; a ball bearing member common to both of said shafts and supporting independently of each other the end portions of the shafts, which are directed toward each other; other ball bearings supporting the opposite ends of said shafts, the balls in said bearings being in frictional contact with the surface of the shafts.

37. In a scale, the combination of scale levers and a weight absorbing mechanism connected with said scale levers; a yoke having two lateral arms and one central arm supporting said weight absorbing mechanism; a pair of shafts in alinement and in abutment with each other on which parts of the weight absorbing mechanism are carried; a double ball bearing located in the central arm of the yoke for supporting both of the shafts; and additional ball bearings located in lateral arms of the yoke for supporting opposite ends of said shafts, the balls of said bearings being in frictional contact with the surface of said shafts.

38. In a scale, the combination of a scale lever; a weight absorbing mechanism connected with said scale lever; a yoke supporting said weight absorbing mechanism, said yoke comprising lateral arms and a central arm; ball bearings mounted in said arms; and shafts carried by said ball bearings, said shafts being in axial alinement with each other and being in abutment with each other, the abutting surface on each of the shafts being a convex surface, the central part of which is in frictional engagement with the central part of the convex surface at the end of the other shaft, the opposite ends of the shafts being pointed and the ball bearings supporting said opposite ends being provided with a walled surface with which the pointed ends of the shafts are in frictional central engagement.

39. In a scale, the combination of a rotary shaft having a non-circular shoulder; a disk element provided with a non-circular aperture corresponding in shape to said non-circular shoulder, said shaft being provided with an additional circular shoulder; another element having a central circular aperture mounted on said circular shoulder, and means for preventing relative rotary movement of one of said disk elements with respect to the other.

40. In a scale, the combination of a rotary shaft having an enlargement; a non-circular shoulder adjacent said enlargement on the shaft; a disk element having a non-circular opening mounted on said non-circular shoulder; said shaft being provided adjacent said non-circular shoulder with an additional circular shoulder of smaller diameter; a disk element having a central circular aperture whereby it is seated on said circular shoulder, and means for preventing rotation of one of said disk elements with respect to the other.

41. In a scale, the combination of a platform, a scale lever, a stirrup interposed between said scale lever and platform, a link connecting the stirrup to the scale lever, a knife edge supporting the link, a clip protecting the knife edge in the link, and a check clip in engagement with the first named clip and scale lever.

42. In a scale, the combination of scale levers, a weight absorbing mechanism, a link flexibly connected with the weight absorbing mechanism, a nose iron of channel-shaped cross-section attached to the scale lever, and a pointed screw inserted in said nose iron and engaging said link, said pointed screw being provided with an enlargement above the point of the screw which enlargement fits into the channel of the nose iron.

43. In a scale, the combination of a scale lever, a weight absorbing mechanism, a stirrup flexibly connected with the weight absorbing mechanism, a nose iron of channel-shaped cross-section on said scale lever, said link being provided with a portion having a central depression; a pointed screw in the nose iron entering said depression, said screw being provided with an enlargement above the point, said enlargement fitting the channel of said nose iron, and means above the channel for adjusting said pointed screw in position with respect to said nose iron.

44. In a scale, a plurality of scale levers, weight absorbing pendulums connected with said scale levers and having a common support in the scale, a fan-tail chart, an indicator adapted for movement over said chart, and means for supporting said indicator in a vertical plane through said common support below said common support and independently of said weight absorbing pendulums, said vertical plane also containing the axis of the scale.

45. In a scale, a plurality of scale levers, weight absorbing pendulums connected with said scale levers and having a common support in the scale, means for adjusting the common support of said weight absorbing pendulums in vertical direction, and means for adjusting the support of said pendulums in axial direction with respect to the axis of the scale levers.

46. In a scale, a plurality of scale levers, a weight absorbing mechanism, a yoke in which said weight absorbing mechanism is supported, means for adjusting the position of said yoke vertically with respect to the plane of the scale lever, and means for adjusting the weight absorbing mechanism in axial direction within said yoke with respect to the axis of the scale levers.

47. In a scale, a plurality of scale levers, weight absorbing mechanism connected with said scale levers, a yoke in which said weight absorbing mechanism is pivotally supported, means for shifting the pivot of said weight absorbing mechanism in axial direction with respect to the axis of the scale levers, a central screw holding the yoke, said screw acting as a means for raising and lowering the support of the weight absorbing mechanism with respect to the scale levers.

48. In a scale, the combination of a scale lever, a knife edge rigidly mounted therein, a link movably suspended from said knife edge, another knife edge rigidly fastened to said link, a bottle-shaped platform support held on said last named knife edge, a sleeve formed by the neck of the bottle-shaped support and platform, and a lug of the platform entering said sleeve.

In testimony whereof I affix my signature.

JAMES M. TRINER.